United States Patent [19]
Unterberger et al.

[11] Patent Number: 5,928,712
[45] Date of Patent: Jul. 27, 1999

[54] METHOD AND APPARATUS FOR MANUFACTURING AN OPTICAL RIBBON CONDUCTOR

[75] Inventors: Siegfried Unterberger; Karl Eidling, both of Egling; Gerd Kohler, Munich, all of Germany

[73] Assignee: Siemens Aktiengesellschaft, Munich, Germany

[21] Appl. No.: 08/837,318

[22] Filed: Apr. 11, 1997

[30] Foreign Application Priority Data

Apr. 11, 1996 [DE] Germany .............................. 196 14 361

[51] Int. Cl.⁶ ................................. B05D 5/06; B05C 3/02
[52] U.S. Cl. ............................ 427/9; 427/163.2; 427/358; 427/385.5; 427/434.7; 118/405; 118/419; 118/420; 118/428; 118/692
[58] Field of Search ............................... 427/163.2, 385.5, 427/434.7, 9, 358, 162; 118/405, 419, 420, 692, 428

[56] References Cited

U.S. PATENT DOCUMENTS 5,486,378   1/1996   Oestreich et al. .................. 427/163.2

*Primary Examiner*—Janyce Bell
*Attorney, Agent, or Firm*—Hill & Simpson

[57] ABSTRACT

A method and an apparatus for forming a waveguide conductor ribbon by passing several light waveguides through a through-opening so that as the waveguides are passed through the opening, they are coated by a liquid coating material, which creates a drag force current for moving the waveguides through the opening. The diameter of the light waveguides and/or the position of the light waveguides inside the ribbon conductor is determined and the width of the through-opening of the coating apparatus is modified on the basis of the measured diameter value and/or on the basis of the size of any gap between the fibers to optimize the amount of drag current forces being produced.

12 Claims, 3 Drawing Sheets

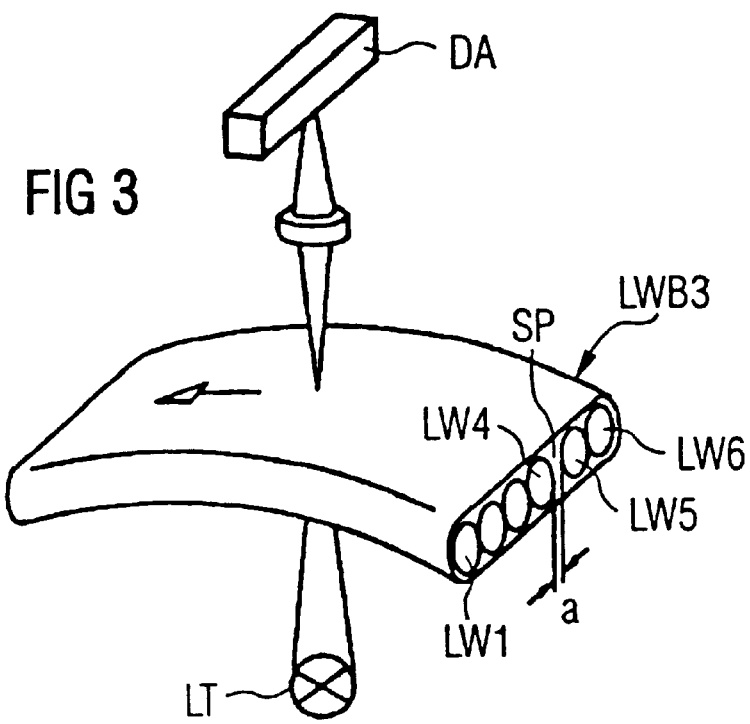
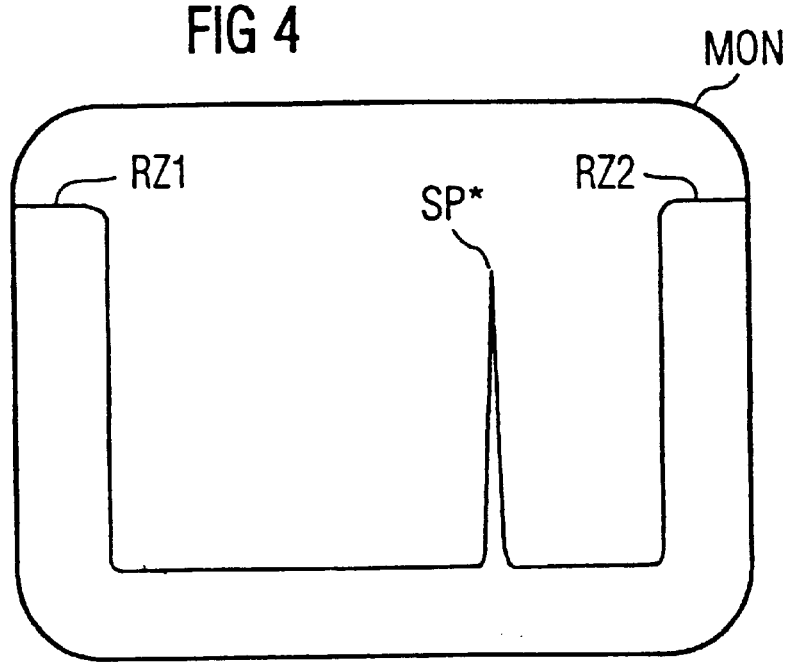

METHOD AND APPARATUS FOR MANUFACTURING AN OPTICAL RIBBON CONDUCTOR

BACKGROUND OF THE INVENTION

The present invention is directed to a method for manufacturing an optical ribbon conductor in which several light waveguides are led side-by-side through a predetermined through-opening of a coating arrangement that surrounds them with a coating material and the longitudinal motion of the light waveguides is produced by means of a drag flow or current of the liquid coating material through the through-opening.

A method is known from U.S. Pat. No. 5,486,378. The desired drag flow of the liquid coating material is obtained by matching a predetermined viscosity of the coating material, the individual parameters of the waveguide and, in particular, the nozzle gap between the nozzle exit opening and the light waveguides. Since, however, the coated light waveguides with multi-plies fluctuate in their outer diameters, in particular from one charge of material to another, the setting and maintenance of the desired drag flow forces is not always guaranteed with sufficient quality in some circumstances.

SUMMARY OF THE INVENTION

The object of the present invention is to provide a method and apparatus in which the difficulties resulting from the fluctuation in the diameters of the light waveguides can be removed as thoroughly as possible. This object is solved in a method of the type wherein the diameter of the light waveguides and/or the position of the light waveguides inside the ribbon conductor is continually determined, and in that the width of the through-opening of the coating apparatus is modified on the basis of the measured diameter values and/or on the basis of the quality of the centering inside the ribbon conductor in such a way that the residual gap width not occupied by the light waveguides essentially comprises a predetermined value, measured in the direction of the light waveguides lying next to one another and even given diameter fluctuations of the light waveguides.

The invention thus creates the possibility of adapting the remaining residual gap width respectively to the predetermined or occurrent fluctuations of the diameter values of the light waveguides, and thus of optimizing the drag current or force. The light waveguides can also be tinted or can comprise an external tinted layer that changes the diameter.

It can be useful to set the residual gap width to a constant value within certain tolerances. However, it is also possible to change the predetermined value, continuously if necessary, according to the respective continuous diameter fluctuations. In many cases, a predetermined value of the residual gap width can be maintained unaltered within a charge of light waveguides. This is possible because a predetermined charge of a particular manufacturer generally exhibits hardly any diameter fluctuations in itself, for example it usually suffices in this case to carry out a one-time measurement process, or only a few such measurements, during the processing and correspondingly to subsequently set the residual gap width to a fixed predetermined value. Since the diameter fluctuations within a charge from a light waveguide manufacturer are generally small, these slight residual fluctuations can be left out of consideration. If, on the other hand, a new charge of light waveguides is being processed to form a ribbon, it is very useful to carry out a setting process again for the residual gap width, in order to set the desired optimum residual gap width for this new charge of light waveguides. This change, which occurs from charge of light waveguides to a second charge, makes it possible to simplify the setting process considerably, since the work can take place within the charge with a residual gap width that practically remains the same, without additional continuous measurements and subsequent regulation. If, on the other hand, different or unknown charges are processed, it becomes useful to continuously determine the diameter value and to continuously readjust the residual gap width.

According to the first embodiment, the determination of the diameter of the light waveguides is carried out before the inflow into the coating arrangement, so that the total width of all the light waveguides lying next to one another usefully represents the output value, which is the basis for the residual gap width. Thus, the open gap space can be optimally set so that the drag flow or current carries the light waveguides along and centers them or, respectively, symmetrizes them optimally within the ribbon.

However, it is also possible to examine the already-coated ribbon in order to discover how precise the symmetry or centering of the light waveguides within the ribbon is. If the drag flow is optimal, there results an exact centering or, respectively, symmetrization. If, on the other hand, no optimum drag flow occurs, due to a diameter fluctuation, because the residual gap width is either too large or too small as a result of the diameter fluctuations, then the desired readjustment size for the setting of the width or of the through-opening can likewise be obtained from this analysis of the finished ribbon conductor.

The invention is also concerned with an apparatus for manufacturing an optical ribbon conductor with a coating means through which several light waveguides are led next to one another, and wherein a drag current or flow is produced inside the coating arrangement by the liquid coating material. This arrangement is characterized in that at least one sensor is provided at the input side and/or at the output side, which sensor enables the diameter value of the light waveguides and/or the quality of the centering inside the ribbon conductor to be determined and the through-opening of the coating apparatus is constructed so as to be adjustable and a setting means is provided, by which the width of the through-opening is reset on the basis of the measurement quantities of the diameters of the waveguides calculated by the sensor.

Other advantages and features of the invention will be readily apparent from the following description of the preferred embodiments, the drawings and claims.

BRIEF DESCRIPTION OF THE DRAWINGS

FIG. 3 is a perspective view of a design of sensors for determining the diameter value or, respectively, the centricity in the finished ribbon conductor;

FIG. 4 is a display of the data produced by a sensor, such as shown in FIG. 3.

DESCRIPTION OF THE PREFERRED EMBODIMENTS

Figure 1:
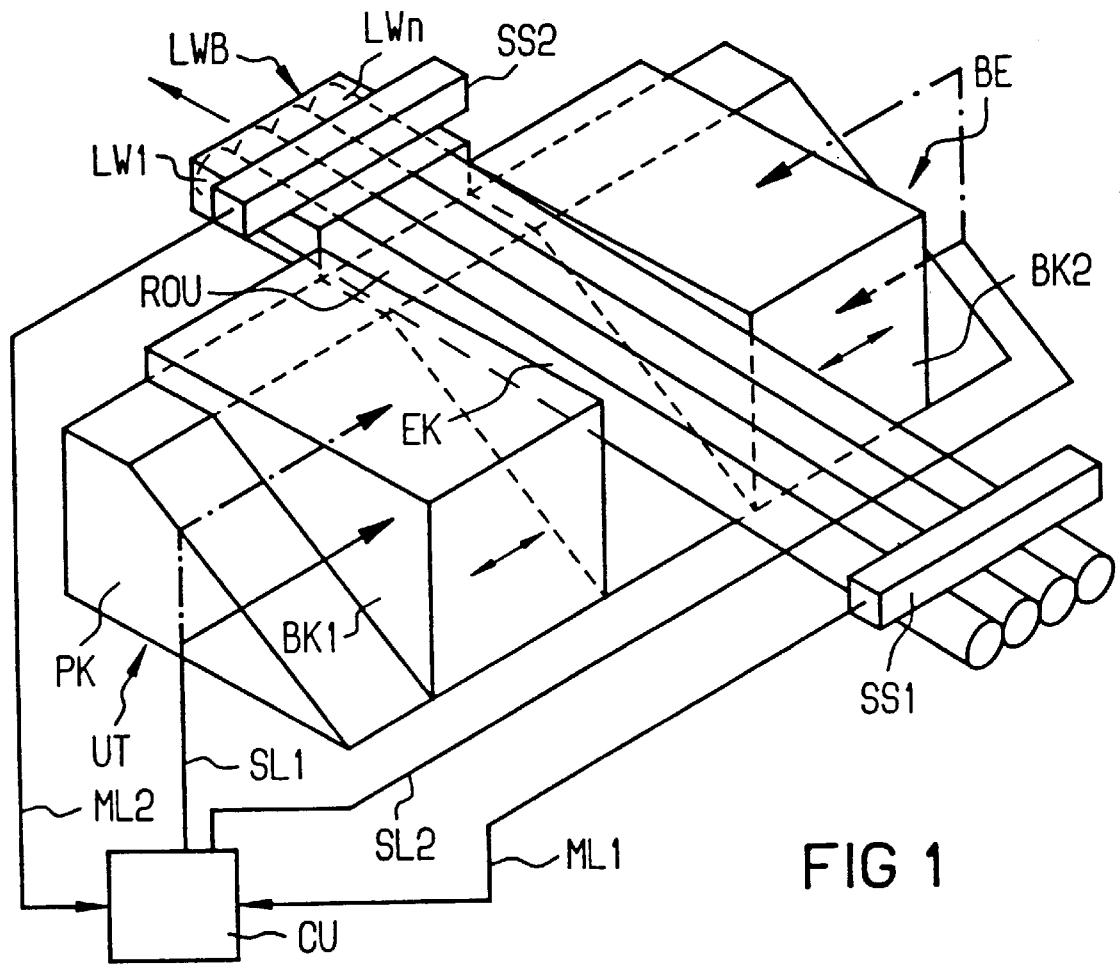
FIG. 1 is a schematic perspective view of a part of an apparatus for carrying out the inventive method.

The principles of the present invention are particularly useful when incorporated in a coating apparatus, generally indicated at BE in FIG. 1, which coating apparatus or means has a lower unit part, generally indicated at UT. A corresponding upper part OT, which is not shown in FIG. 1, is conceived to rest upon the lower part UT and has a mirror-inversed form, with the same design as the lower part UT. Only the part of the coating arrangement or apparatus BE at the outflow side is shown, whereby the remaining overall design corresponds to that described in U.S. Pat. No. 5,486,378, whose disclosure is incorporated herein by reference thereto.

A prism-shaped guide element PK is provided in the lower part UT of the coating apparatus BE. On this element PK, two limiting elements BK1 and BK2 are arranged with a narrow passage or inflow channel EK therebetween. Between the limiting elements BK1 and BK2, the gap EK is formed that has a depth that decreases or narrows in the direction of the passage, so that the liquid coating material continues flowing into a channel of decreasing size and thus with increasing speed. The width of the inflow channel EK is advantageously constant in the direction of passage, or is fashioned with a slight tapering decrease of between 2° and 5°. A number of light waveguides LW1–LWn is led through the coating arrangement BE, and, in the illustrated embodiment, four light waveguides are illustrated. Perpendicular to the width of the light waveguides LW1–LWn, the inflow channel EK narrows in the direction of passage, advantageously between 2° and 5°, and finally ends in a rectangular exit or outflow channel that carries out the actual coating and simultaneous centering of the waveguides within the ribbon being formed.

Figure 2:
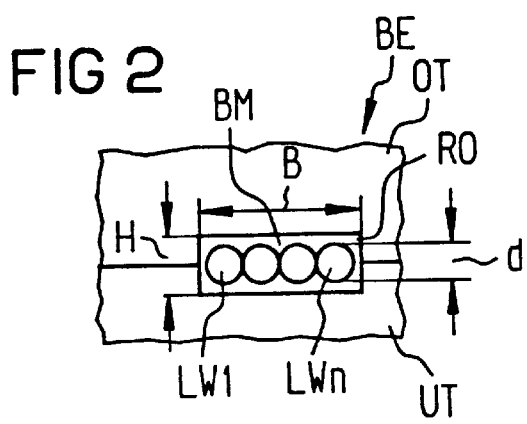
FIG. 2 is an end view of the through-opening at the exit of the coating apparatus of FIG. 1.

The outflow channel, of which only a lower part ROU is visible in FIG. 1, is completely shown in FIG. 2 and is designed RO. The channel RO has a width B and a height H. Given n light waveguides, the width B of the channel RO is slightly larger by an amount db than the width nd of the waveguides LW1–LWn, which have a diameter d. Thus, B=nd+db. The value db is usefully in a range between 20 $\mu$m and 80 $\mu$m.

The height H is also slightly larger by an amount dh than the diameter d of the light waveguides, so that H=d+dh. The value dh is usefully in a range of between 20 $\mu$m and 80 $\mu$m.

As illustrated in FIG. 2, it can also be seen that the point of the contact between the lower part UT and an upper part OT of the coating apparatus BE runs symmetrical to the approximately rectangular through-opening RO and in the plane of the axes of the light waveguides LW1–LWn, which are arranged to lie next to one another. By means of the drag current of the coating material BM, the gusset spaces between or on the light waveguides are completely filled with the filling material and there results as a final product a finished light waveguide ribbon LWB (see FIG. 1) at the exit of the coating means, arrangement or apparatus BE. Given optimal centering, the light waveguides LW1–LWn abut immediately on one another.

The light waveguides LW1–LWn do, indeed, have predetermined nominal outer diameters, which is generally 250 $\mu$m. However, in practice, there occurs diameter fluctuations from 0 to 20 $\mu$m per light waveguide. Since it must also be taken into account that, for example, only light waveguides with overtolerances, which are larger than the target value, or only those with undertolerances, which are smaller diameter than the target value, pass through the coating arrangement BE, difficulties can occur concerning the formation and the quality of the drag current, since, besides the viscosity of the coating material BM, this current will depend upon all of the width B and the height H of the through-opening RO, in relation to the respective space actually filled by the light waveguides. The respective residual gap width db is a decisive criterion for the quality of the drag current forces that will develop and, thereby, finally also for the centering of the light waveguides inside the light waveguide ribbon conductor LWB. This centering should be carried out in such a way that, seen in the width B, the axes of all the light waveguides lie as much as possible in one plane, respectively symmetrical to the outer boundary of the ribbon conductor LWB. The light waveguides LW1–LWn are also each supposed to lie symmetrical to the center at B/2 in the width of the ribbon. The upper and lower covering layers seen in the height H should also be respectively about the same thickness at both broad sides of the ribbon. Given a complete centering, a complete symmetry of the light waveguides LW1–LWn is thus obtained both in the width and in the height within the outer walls of the ribbon conductor.

The determination of the diameter of the light waveguides LW1–LWn can be carried out before and/or after the coating arrangement BE. In the present example, according to FIG. 1, a sensor SS1 is shown that scans the light waveguides LW1–LWn for their diameter values before they enter into the coating apparatus BE.

This sensor can measure without contact, for example with light, wherein it contains one or several light sources that produce a shadow image of each of the light waveguides so that the shadow image is evaluated for the sum of all n shadows and the total width of all n light waveguides thus is obtained. For example, this measurement can yield the following values: LW1=260 $\mu$m, LW2=255 $\mu$m, LW3=250 $\mu$m, LW4=257 $\mu$m. All together, the four adjacent light waveguides thus have a total width of 1022 $\mu$m, which represents a correspondingly larger value than the nominal value of 4×250 $\mu$m=1000 $\mu$m. Accordingly, in order to obtain optimum drag current conditions and also to avoid contact with the side walls of the through-opening RO by the light waveguides LW1–LWn, the width of the through-opening must be expanded. For this purpose, at least one of the two side walls of the through-opening is fashioned so as to be movable, whereby it is useful to move both side walls uniformly in order to obtain a complete symmetry. In the present example, the measurement quantity determined by the sensor SS1 for the total sum of all diameter values of the light waveguides LW1–LWn is relayed to the central control unit CU by a measurement line ML1. The control unit CU creates a correcting quantity equal to 22 $\mu$m by comparing the actual value of 1022 $\mu$m with the target value of 1000 $\mu$m. The correcting quantity is supplied to the two limiting elements BK1 and BK2 through control lines SL1 and SL2. Corresponding to the preceding example, with a total diameter of light waveguides LW1–LW4 of 1000 $\mu$m, an enlargement of the width B of the through-opening RO is to be carried out by a value of 1022 $\mu$m−1000 $\mu$m=22 $\mu$m. Each of the limiting elements BK1 and BK2 is usefully displaced outward by half this value. In this way, it is ensured that the symmetry of the passage of the light waveguides can be maintained in an unaltered state, for example, no lateral displacement of the finished ribbon conductor LWB will occur.

It is also possible to construct the sensor SS1 as a mechanical sensor, for example in the form of a spring, like a flat spring, or a spring-mounted roller, that will press the light waveguides against one another. The position of an indicator element, for example a pointer connected with the spring, then will represented the changes correspondingly, given resulting diameter fluctuations. However, optical measurement methods generally work more precisely than the mechanical means.

It is also possible to carry out the measurement at the output side, for example, after the coating apparatus BE. This is indicated by the sensor SS2, which scans the finished flat ribbon conductor LWB, and which can gear its measurements to various quality features. For example, the centricity, for example the symmetry of the light waveguides LW1–LWn inside the ribbon conductor LWB, can be determined. If this displays deviations in a larger degree from the desired target value, for example a gap width between adjacent waveguides of greater than 5 μm, then this is a sign that the width of the through-opening RO must be accordingly readjusted. The corresponding measurement signal flows via the circuit or measurement line ML2 to the central control unit CU, and, in turn, causes, via the control lines SL1 and SL2, the resetting of the limiting elements BK1 and BK2, which immediately influence the width B of the through-opening RO. Since a total of four limiting elements are arranged, namely two BK1 and BK2 in the lower part and, mirror-inversed to these, two more in the upper part OT (not shown here), given a fully symmetrical design, four resetting means, for example in the form of positioning motors or the like, are required in order to obtain the desired displacement. The actuation of the upper limiting elements is indicated by the dot-dashed line extensions of the control lines SL1 and SL2, respectively.

A light waveguide ribbon conductor LWB3, which contains six light waveguides LW1–LW6, is illustrated in FIG. 3. It is assumed here, as a result of an excessively small diameter value, a gap SP with a width a has formed between the fourth light waveguide LW4 and the fifth light waveguide LW5 because the drag current forces were no longer large enough to ensure a completely centered arrangement of the light waveguides LW1–LW6. For the determination of this gap SP with a width a, a light source LT is provided that illuminates the full width of the light waveguide conductor ribbon LWB3. A light diode array DA is provided on the opposite side, and this array is capable of receiving, for example, 2048 pixels. Given a uniform complete occupation and a complete centering of the light waveguides LW1–LW6 inside the light waveguide ribbon conductor LWB3, only the outer elements of the array DA are activated, since their light penetrates through the mostly transparent resin matrix, which matrix surrounds the light waveguides LW1–LW6 on all sides so as to form the light waveguide conductor ribbon LWB. The light waveguides LW1–LW6 are normally tinted and, thus, produce no indication or, respectively, no light signals in the corresponding elements of the diode array DA.

If, on the other hand, a gap SP occurs that has a certain width a, a light signal then enters through this gap, because the resin matrix is generally transparent to light for the ribbon manufacture, and the light will flow to a corresponding element in the diode array DA. In this way, a signal is provided that will trigger the resetting process described in connection with FIG. 1.

The intensity distribution obtained in this case is displayed on a monitor MON for the operator, which monitor is illustrated in FIG. 4. In the left and right edge, there respectively occurs higher impulses RZ1 and RZ2 through those regions at the side edges at the light waveguide conductor ribbon LWB3, where no light waveguides exist and only the matrix material is present. In addition, given insufficient centering, at least one signal SP* occurs at the point where the light waveguides LW1–LW6 do not lie immediately on one another. The size of this impulse and/or its width are an immediate measurement for the width a of the gap SP.

Figure 5:
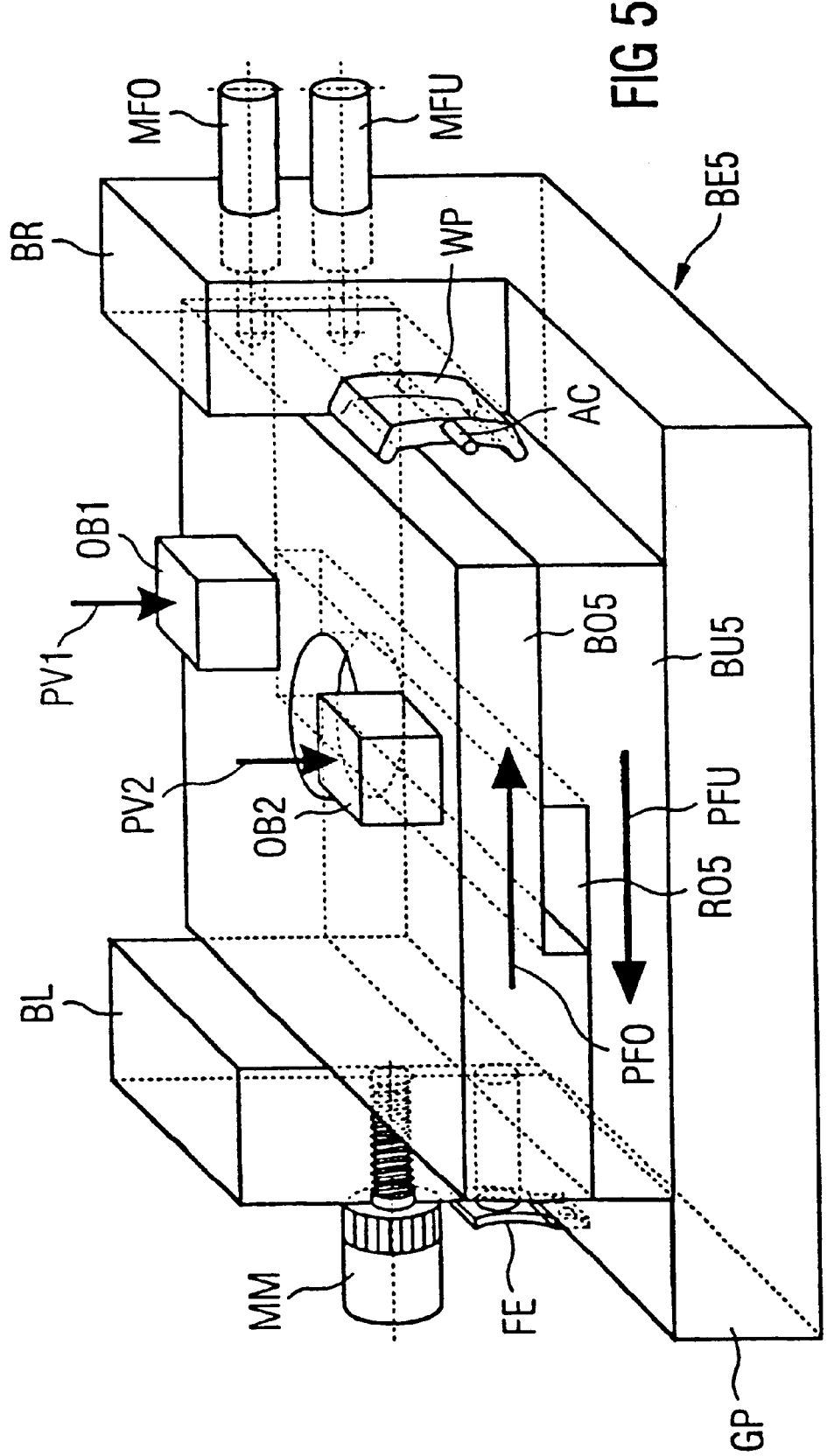
FIG. 5 is a perspective view of a complete coating apparatus illustrating an additional embodiment of the invention.

As already mentioned, it is useful to carry out the adjustment of the exit opening symmetrically from both sides, so that the axis of the light waveguide conductor ribbon remains unchanged. An example of a practical construction of a coating arrangement of this type is shown in FIG. 5, which illustrates the adjustment of the width of a through-opening RO5. The coating arrangement BE5 consists of a basic plate GP and two structural parts BU5 and BO5, which are attached thereto and which parts are of the same construction but are laid on one another in mirror-inverted form. Approximately in their center, the through-opening RO5 is formed, through which the finally coated light waveguides exit as a ribbon. The division of the two parts BO5 and BU5 is carried out in such a way that, respectively, the lower part forms a side wall, such as the right side or end surface or wall, and the base wall, while the upper part BO5 forms the left side or end surface or wall and the cover wall of the through-opening RO5. By means of this type of stepped construction of the planes of the division, the two parts, as indicated by the arrows PFO and PFU can be displaced uniformly against one another and yield a symmetrical reduction of the width of the through-opening RO5. In particular, this displacement is carried out, for example, by means of a micrometer screw MM mounted in a block BL on the ground plate GP. This micrometer screw acts on the upper cover plate BO5 and displaces this plate to the right, as indicated by the arrow PFO. On the opposite side, a U-shaped rocker WV) is mounted for rotation on an axle AC, which is attached in a fixed mounting block BR. The rocker WP is positively connected with the side wall of an upper cover plate BO5. When the upper cover plate is displaced, a force is exerted on the lower plate BU5 through the rocker WP, which rotates on an axle AC. The lower plate will thus be displaced to the left, as indicated by the arrow PFU. By means of a spring FE that engages on the lower part and is mounted in the left block BL, the guiding back of the two parts BU5 and BO5 is carried out in the opposite direction upon rotation of the micrometer screw MM.

To hold the two plates BO5 and BU5 together with a solid cohesion, blocks OB1 and OB2, which are attached on the top to the plate BO5, are pressed downward by means of vertical forces corresponding to the arrows PV1 and PV2. This will result in a precise formation of the rectangular exit opening RO5. The displacement path executed by the upper plate BO5 and the lower plate BU5 can be read off at the two measurement sensors MFO and MFU.

In place of the comparison process carried out by an operator, the optimization of the width of the gap RO5 can also occur automatically by means of an automatic control process according to FIG. 1. The setting force thereby acts on the micrometer screw MM, for example, by means of a positioning motor.

Although various minor modifications may be suggested by those versed in the art, it should be understood that we wish to embody within the scope of the patent granted hereon all such modifications as reasonably and properly come within the scope of our contribution to the art.

We claim:

1. A method for manufacturing an optical ribbon conductor comprising the steps of passing a plurality of light waveguides side-by-side through a through-opening of a coating apparatus, and applying a liquid coating material onto the light waveguides with a flow of the liquid coating material creating a drag current for imparting a longitudinal motion to the waveguides, selectively determining at least one of the diameters of the light waveguides and the positions of the light waveguides in the ribbon conductor being formed, and adjusting the width of the through-opening of the coating apparatus in response to measured values of the at least one of the diameters and the positions so that a residual gap width not occupied by the light waveguides is a predetermined value measured along the direction of the light waveguides lying next to one another, even with fluctuations in the diameters of the light waveguides, and the positions of the light waveguides in the ribbon conductor.

2. A method according to claim 1, wherein the width of the through-opening is modified on both sides symmetrically to the ribbon conductor axes.

3. A method according to claim 1, wherein width of the through-opening is modified by at least two movable limiting elements and the spacing between the elements is modified in response to the measured value.

4. A method according to claim 1, wherein the width of the through-opening is modified by four movable limiting elements and the spacing of all of the limiting element is modified during modification of the through-opening.

5. A method according to claim 1, wherein the through-opening has essentially a rectangular cross section at the exit of the coating arrangement.

6. A method according to claim 1, which includes passing the light waveguides through an introduction channel that narrows in the direction of passage prior to passing through the through-opening.

7. An apparatus for manufacturing an optical ribbon conductor having a plurality of light waveguides extending side-by-side and surrounded by a coating material, said apparatus including a coating means having a through-opening through which the light waveguides pass side-by-side and means for flowing a liquid coating material through the through-opening to create a drag current force for moving the waveguides therethrough, at least one sensor means being provided for selectively determining the diameter values of the light waveguides and the quality of the centering of the waveguide inside the ribbon conductor, said sensor means being positioned at one of the input and output sides of the coating means, said through-opening being constructed to be adjustable in size and at least one setting means being provided to adjust the width of the through-opening in response to measurements obtained from the sensor means.

8. An apparatus according to claim 7, wherein the through-opening is formed by two sub-regions of the coating means.

9. An apparatus according to claim 7, wherein the two sub-regions are divided along a plane of division and have a stepped structure.

10. An apparatus according to claim 9, wherein the sub-regions are laterally connected with one another in a non-positive fashion via a rocker arm so that movement of one of the two sub-regions in one direction causes the other of the two sub-regions to move in the opposite direction.

11. An apparatus according to claim 7, wherein the adjustable opening is formed by a pair of plate members, each plate member having a stepped portion to provide one side surface and an edge surface of the through-opening of the coating apparatus, said members being arranged with the edge surface of each member facing the other and the side surfaces facing each other to create a rectangular through-opening.

12. An apparatus according to claim 11, which includes a rocker engaging the two members so that movement of one member in one direction transfers movement to the other member in the opposite direction.

* * * * *